(12) United States Patent
Dubaniewicz et al.

(10) Patent No.: US 6,667,801 B1
(45) Date of Patent: Dec. 23, 2003

(54) METHOD AND APPARATUS FOR SAFETY TESTING OPTICAL SYSTEMS FOR HAZARDOUS LOCATIONS

(75) Inventors: Thomas H. Dubaniewicz, Bethel Park, PA (US); Gregory M. Green, Benwood, WV (US)

(73) Assignee: The United States of America as represented by the Department of Health and Human Services, Washington, DC (US)

( * ) Notice: Subject to any disclaimer, the term of this patent is extended or adjusted under 35 U.S.C. 154(b) by 0 days.

(21) Appl. No.: 09/958,977
(22) PCT Filed: Apr. 10, 2000
(86) PCT No.: PCT/US00/09571
§ 371 (c)(1), (2), (4) Date: Oct. 12, 2001
(87) PCT Pub. No.: WO00/63666
PCT Pub. Date: Oct. 26, 2000

Related U.S. Application Data

(60) Provisional application No. 60/129,470, filed on Apr. 15, 1999.

(51) Int. Cl.[7] ............................................... G02B 27/32
(52) U.S. Cl. ........................................................ 356/256
(58) Field of Search ................... 356/256, 432, 356/445; 250/226, 227.14, 227.15, 227.18, 227.23, 302, 303, 458.1, 461.1, 492.1, 372, 554

(56) References Cited

U.S. PATENT DOCUMENTS

| | | | | |
|---|---|---|---|---|
| 4,368,481 A | | 1/1983 | Ohashi et al. | 357/30 |
| 4,688,884 A | | 8/1987 | Scifres et al. | 350/96.15 |
| 5,125,739 A | * | 6/1992 | Suarez-Gonzalez et al. | 356/45 |
| 5,659,133 A | * | 8/1997 | Sims et al. | 73/116 |
| 5,729,012 A | | 3/1998 | Wood et al. | 250/227.15 |
| 5,828,797 A | * | 10/1998 | Minott et al. | 385/12 |

* cited by examiner

*Primary Examiner*—Michael P. Stafira
(74) *Attorney, Agent, or Firm*—Klarquist Sparkman LLP

(57) ABSTRACT

A method of determining the ignition characteristics of an optical source emitting optical power into a hazardous environment includes providing a chamber and a tapered optical fiber having an input end and an output end, wherein the output end has a smaller diameter than the input end. The output end of the tapered fiber is disposed within the chamber and the input end of the tapered fiber is optically coupled to the optical source for receiving optical power therefrom. Power is first applied to the tapered fiber and the power output at the tapered fiber output end measured. Then a target is applied to the tapered fiber output end, and the chamber is filled with the desired gas/air mixture and the same power applied to the tapered fiber. After power is applied for a period of time, a determination is made whether or not the gas/air mixture ignited.

29 Claims, 7 Drawing Sheets under PCT Article 21(2), and claims the benefit of U.S. application No. 60/129,470, filed Apr. 15, 1999.

METHOD AND APPARATUS FOR SAFETY TESTING OPTICAL SYSTEMS FOR HAZARDOUS LOCATIONS

PRIORITY CLAIM

This is a § 371 U.S. national stage of PCT/US00/09571, filed Apr. 10, 2000, which was published under PCT Article 21(2), and claims the benefit of U.S. application No. 60/129,470, filed Apr. 15, 1999.

FIELD OF THE INVENTION

This invention relates to a method and apparatus for testing optical components located in hazardous environments for the possibility of ignition and/or burning. The method and apparatus of the invention will allow testing laboratories to efficiently and accurately vary the irradiance of optical sources for certifying the safety of optical systems in hazardous (including classified) locations.

BACKGROUND OF THE INVENTION

Fiber optic systems containing intense laser sources, such as laser diodes capable of producing several hundred milliwatts or more of power, are found in numerous industrial measurement, monitoring, and control applications. Besides the risk of human exposure, one safety concern with intense radiation sources is the potential for ignition of flammable gases, vapors, dusts, fibers, or flyings found in some industrial and hazardous locations.

Experiments have shown that optical devices, such as lasers, can provide sufficient energy to cause ignition of flammable gas/air or particulate/air mixtures, and, in some situations, burning of flammable materials present. One ignition process requires the conversion of optical energy to thermal energy by absorption in an appropriate target as shown in FIG. 15. Fiber optic systems placed within hazardous environments (i.e., areas in which there is a chance of explosion due to increased temperatures or flammable combinations of flammable gas/air or particulate/air mixtures) can be a potential ignition source. Faulty optical equipment, broken or stretched fiber optic cable, or improperly installed optical equipment can output optical beams above the critical or flash point in hazardous locations.

One particular application of optical technologies is the remote measurement of explosive methane gas in underground coal mines. Methane gas is often liberated during the mining process. In addition to methane-air mixtures, coal dust suspensions in air represent an explosion hazard and larger accumulations of coal dust on surfaces represent a smoldering fire hazard. Federal regulations require periodic methane measurements at the mining face, and abatement measures must be taken when methane concentrations exceed a threshold. Methane measurements often require elaborate safety precautions to prevent injury in the roof-fall prone face area. The difficulty in making remote methane measurements during extended cut operations has been cited as a safety concern by the United Mine Workers of America.

A remote measurement procedure has been proposed (see FIG. 13) in which an open laser beam passes through an area where both methane gas and coal dust are normally present. Federal regulations require that atmospheric monitoring systems used in gassy underground mines shall be intrinsically safe. However, intrinsic safety applies primarily to preventing electrical sparks or electrical heating ignition mechanisms. Little or no consideration has been given to optical ignition mechanisms because typical lasers used in mines have very low power. Also, the Mine Safety and Health Administration (MSHA) criteria for the evaluation and test of intrinsically safe apparatus and associated apparatus contain no specific guidance for optoelectronic components such as laser diodes.

One way to ensure the safety of a remote optical monitor is to limit the energy of the laser beam to below the critical duration and intensity which will result in ignition or burning in the proposed environment. Previous techniques to determine the duration and intensity needed for an optical component for ignition studies used external optical components to vary the irradiance (the optical power per area or optical power density) of the optical sources. Five cooperating laboratories in Europe investigated the conditions under which optical instruments using intense light sources (such as lasers) could operate safely in hazardous atmospheres containing vapors of various combustible products and/or combustible particulates. This study investigated the nature of light (i.e., coherence, intensity, wavelength, spectral width, and modulation), the characteristics of the illuminated particles (i.e., size, chemical and physical nature), and the nature of the gaseous environment. This study concluded that continuous wave devices radiating in the visible and near visible are not hazardous provided either the radiated power is less than 35 milliwatts, or the peak radiation flux is less than 5 milliwatts per square millimeter.

Details the these experimental techniques employed by the five cooperating laboratories is described in the report, "Optical Techniques in Industrial Measurement: Safety in Hazardous Environments," European Commission, EUR 16011 EN, 1994. However, these techniques required very careful alignment and typically were designed for a single type optical source and were not easily adaptable to different optical sources. Accurately verifying the spot size of the output beam was also difficult, resulting in a time consuming test setup and the need for a variety of components (including different lenses and optical fibers) on hand to accommodate different optical sources. Also, the power values concluded to be safe may not be sufficient to provide remote monitoring in applications such as remote monitoring of methane in a mining operation.

There is a need for a method of testing optical systems, especially when installed in hazardous locations, to determine the risk of ignition. There is a need for a method of determining the maximum safe power output of an optical system to avoid the risk of ignition in a hazardous location. There is also a need for a method of determining the maximum safe power output of an optical system to avoid the risk of burning in hazardous locations where flammable materials are present. There is a need for an apparatus or system for testing optical systems for risk of ignition and burning which is easy to use with different optical sources. There is also a need for an optical test apparatus or system which provides for precise adjustment and verification of the output beam spot size. There is a need for an optical test apparatus or system which does not require use of additional components to accommodate different optical sources. There is also a need for a method to evaluate the failure mode when an optical fiber is stretched to the breaking point, with a concurrent reduction in fiber diameter, increasing the irradiance of escaping laser power. The present invention provides such methods and systems.

SUMMARY OF THE INVENTION

A method of determining the ignition characteristics of an optical source emitting optical power into a hazardous environment according to the invention includes providing a chamber and a tapered optical fiber having an input end and an output end, wherein the output end has a smaller diameter than the input end. The output end of the tapered fiber is disposed within the chamber and the input end of the tapered fiber is optically coupled to the optical source for receiving optical power therefrom. Power is first applied to the tapered fiber and the power output at the tapered fiber output end measured. Then a target is applied to the tapered fiber output end, and the chamber is filled with the desired gas/air mixture and the same power applied to the tapered fiber. After power is applied for a period of time, a determination is made whether or not the gas/air mixture ignited.

Apparatus for determining the ignition characteristics of an optical source emitting optical power into a hazardous environment according to the invention includes a chamber for receiving a known quantity of a hazardous material. A tapered optical fiber having an input end and an output end, wherein the output end has a smaller diameter than the input end, wherein the output end is disposed within the chamber. An optical coupler optically couples the tapered fiber input end to the optical source for receiving optical power therefrom. A target is attached to the output end of the tapered fiber and a video camera or pressure sensor is used to determine if ignition occurs when power is applied to the tapered fiber in the gas/air mixture filled chamber.

A method of determining the smoldering or burning characteristics of an optical source emitting optical power into a hazardous environment according to the invention includes measuring the temperature of the target at the tapered end of the fiber optic taper as power is applied to the taper.

The concept of conservation of brightness states that if light losses are negligible, the spatial and angular content of the light anywhere within or at either end of a fiber optic taper are described by:

$$S_i n_i^2 \sin^2(\theta_i) = S_o n_o^2 \sin^2(\theta_o)$$

where subscript i refers to input parameters, subscript o refers to output parameters, S is the cross-sectional area of the light distribution normal to the taper axis, θ is the maximum angular extent of the light distribution, and n is the refractive index of the medium where θ is measured. Since n sin(θ) is defined as the numerical aperture (NA) of the fiber and since $S_i/S_o = R^2$, where $R^2$ is the taper diameter ratio, then $NA_o/NA_i = R$.

These expressions show that fiber optic tapers are useful for transforming spatially structured input beams (such as those produced by different optical sources) into a spatially uniform output spot. Therefore, a single taper can be used to more efficiently guide optical energy from a larger variety of input sources while maintaining uniform output characteristics than possible from a non-tapered fiber. The uniform output characteristics and well-defined taper dimensions allows more accurate measurement of irradiance than practical with the external optical components used by the prior art. Accurate measurements are critical in the safety certification process. Also, by transforming the beam within the taper, external components are not necessary to adjust the power or focus the output spot, simplifying the test setup, reducing component inventory, and reducing the risk of human exposure to the optical beam.

These expressions also show (and as supported by experimental evidence obtained by the inventors) that a fiber optic taper increases the irradiance of an optical source. Thus, a method and apparatus employing a taper allows a controlled way of simulating enhanced irradiance that may occur in a broken optical fiber.

Beam transformation within the fiber eliminates the need for external optical components. Fiber tapers require less careful alignment than external components, simplifying the test setup and reducing setup time. Fiber tapers can accept a wide range of optical sources while maintaining uniform output characteristics, reducing component inventory required if using external components. The well-defined output characteristics of the method of the invention will allow accurate measurement of optical beam properties more easily and reliably than practical with external components.

The method and apparatus of the invention will allow testing laboratories to efficiently and accurately vary the irradiance of optical sources for certifying the safety of optical systems in hazardous (including classified) locations. The irradiance enhancement demonstrated by the method of the invention will allow a controlled method for simulating potential irradiance enhancement of a broken optical fiber. The smaller cross-sectional area of the taper reduces thermal conductivity effects, representing more severe testing conditions of fiber-optical systems than using untapered fibers.

DETAILED DESCRIPTION OF THE PREFERRED EMBODIMENTS

While the invention can be used with many different optical sources to simulate many different hazardous locations, for convenience, the invention will be described with respect to an apparatus and method for use in a coal mining location where the presence of methane must be monitored. The primary mode of ignition for methane-air atmospheres at power levels common in current measurement and control applications requires the simultaneous presence of a flammable methane-air atmosphere, a radiating energy source of the duration and intensity needed to cause ignition, and an appropriate target to convert the optical energy to thermal energy.

Ignition requires the conversion of optical energy to thermal energy by absorption in an appropriate target. The target needs to attain a minimum ignition temperature for a given ignition volume in order to ignite the surrounding gas. Some relevant target properties include absorbance, surface area, volatility, and reactivity with air. It is generally believed that strongly absorbing targets facilitate ignition, but the effect of target surface area, volatility, and reactivity is less clear. For example, small, volatile or combustible targets may vaporize, dissipating the laser energy before igniting the surrounding gas. Larger combustible targets may have sufficient mass to contribute significant heat of combustion to ignite methane-air mixtures more easily than a similarly sized inert target. Also, larger heated targets can ignite methane-air mixtures at lower temperatures than smaller targets, but require higher incident powers to attain similar temperatures as small targets. Small targets that vaporize near appropriate ignition temperatures may ignite gases more readily than other small targets by achieving a minimum volume.

Figure 1:
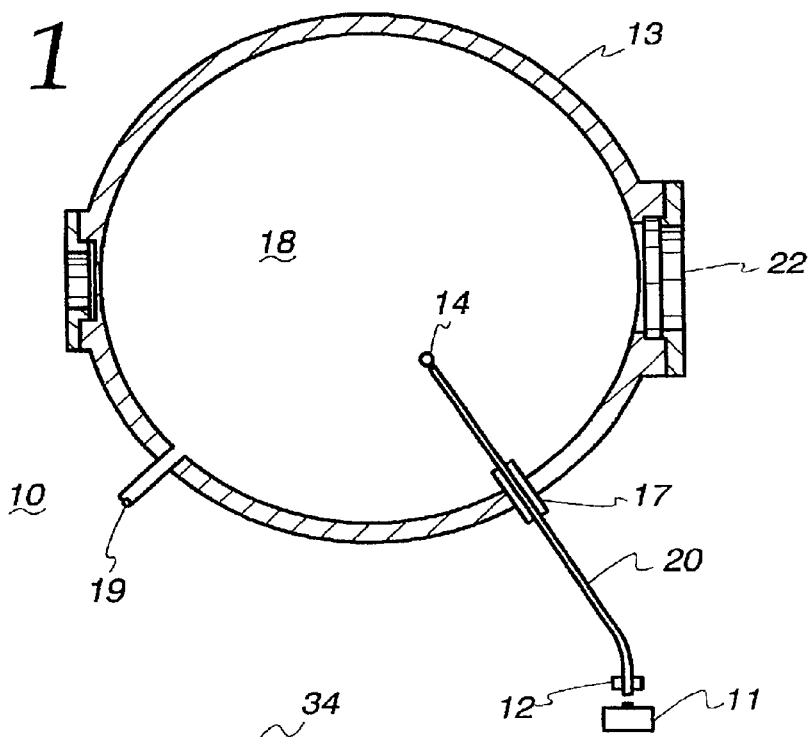
FIG. 1 shows a cross-section of an embodiment of the invention.

Referring now to the drawings and especially to FIG. 1, an apparatus for testing an optical source is generally shown therein and identified by reference numeral 10. Apparatus 10 includes test chamber 13 having a viewing port 22 to which a video camera may be attached for viewing and recording the ignition tests. Preferably the test chamber 13 has a 20-liter interior chamber 18 suitable for explosion testing of dusts, gases, and their mixtures. The chamber 13 can also be used to measure lean and rich limits of flammability, explosion pressures, rates of pressure rise, minimum ignition energies, minimum oxygen concentrations for flammability, and amounts of inhibitor necessary to prevent explosions.

Figure 2:
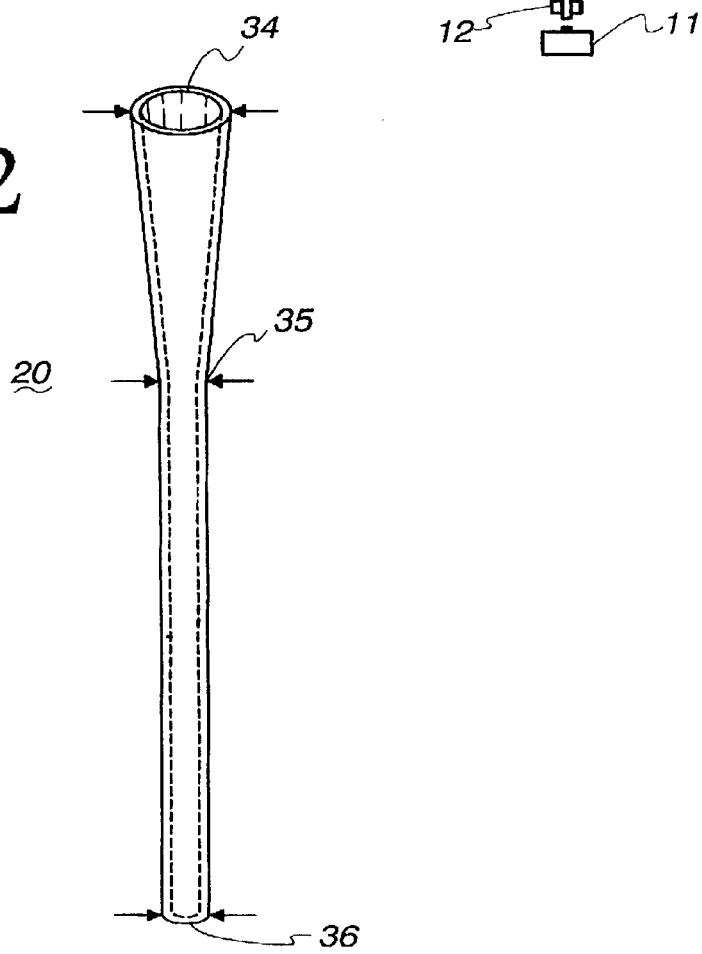
FIG. 2 shows dimensional characteristics of the fiber taper shown in FIG. 1.

A test methane/air mixture is introduced into the chamber through inlet 19. A fiber optic taper probe 20 is inserted through opening 17 of chamber 13 and disposed within the interior 18. Optical energy from optical source 11 is coupled to taper 20 via coupler 12, which is preferably a bulkhead adapter. A target 14 is disposed at the output end of taper 20. The fiber optic taper 20 directs optical energy from the optical source under test 11 into chamber interior 18. Referring to FIG. 2, optical energy launched into the input end 34 of fiber optic taper 20 is tapered down to a small fiber diameter 35 and guided to the output end 36 (where the target is attached, but not shown here) in the ignition chamber 18. Preferably, taper 20 tapers from 400 $\mu$m at input end 34 to 200 $\mu$m at diameter 35 and at output end 36.

Optical source 11 is preferably a SDL model 8110-B Integrated Laser System (ILS). The ILS output power is variable up to 10 watts out of a 400 $\mu$m diameter aperture. The laser diode wavelength is centered at 803 nm in the near infrared. The ILS was operated in constant power mode which eliminated overshoot, and produced a 100 millisecond rise time. The ILS also contains a low power visible aiming laser which is useful for setting up experiments.

Three sizes of fiber optic cable were used. In addition to the fiber optic taper 20, which is preferably a taper from 400 $\mu$m to 200 $\mu$m, non-tapered cable was used for comparison. Commercially available Fiberguide Anhydroguide plastic clad silica (PCS) 400 $\mu$m to 200 $\mu$m fiber optic taper, Spectran 400 $\mu$m core, 430 $\mu$m clad Hard Clad Silica cable, 0.4 numerical aperture (NA), and Fiberguide Anhydroguide PCS, 800 $\mu$m core, 900 $\mu$m clad diameter, 0.4 NA cable were compared.

Selected targets 14 included Pittsburgh seam coal (PC) and black iron oxide. Black iron oxide (a combination of ferrous FeO and ferric $Fe_2O_3$ oxide having a theoretical formula of $Fe_3O_4$) was chosen because of its excellent optical absorption and inertness. Particle size is uniform with an average diameter of approximately 0.4 $\mu$m. Pittsburgh seam coal is used in standardized MSHA dust blanketing tests for intrinsic safety evaluations. The MSHA standardized tests call for dust fine enough to pass through a 200 mesh (75 $\mu$m) screen. Very fine PC particles with a mass median diameter of 3 $\mu$m were used in a series of tests to compare with the iron oxide results. For ignition tests with fine particles, a collection of many particles was placed on the fiber-optic tip 36. Larger individual coal particles approximately the size of the fiber-optic core diameter were used in another series of tests to investigate potential heat of combustion from larger coal particles.

Figure 3:
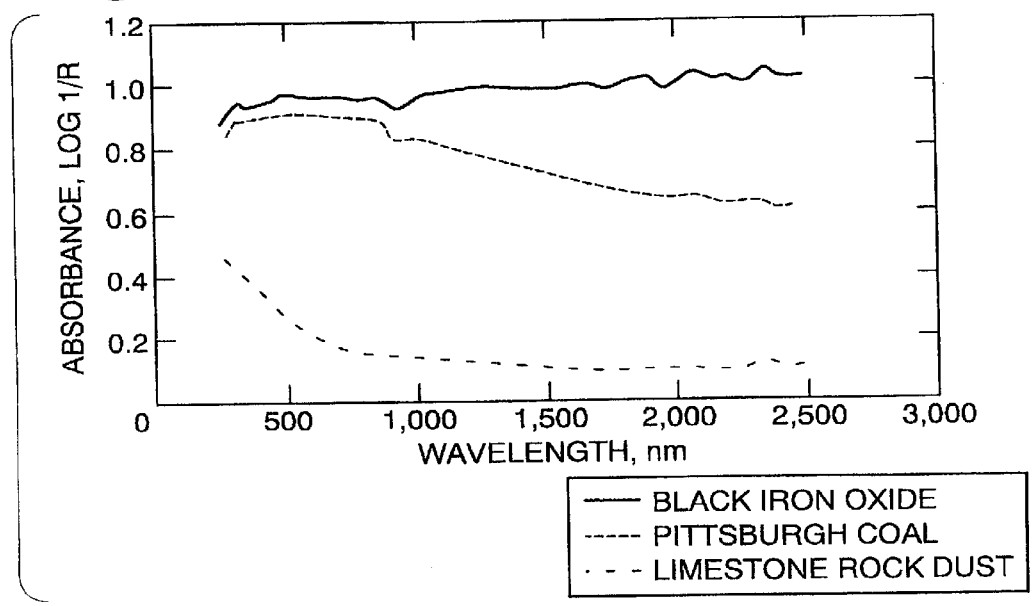
FIG. 3 is a graph of absorbance of black iron oxide, Pittsburgh coal, and limestone rock dust samples.

Absorption characteristics were determined from a sample of iron oxide, 200 mesh PC and limestone rock dust ($CaCO_3$). Referring to FIG. 3, it can be seen that black iron oxide is a slightly stronger absorber than coal over the wavelengths measured. Both are much stronger absorbers of radiation than limestone rock dust, a material commonly applied in underground coal mines to prevent coal dust explosions.

Before each ignition test, the power emanating from output tip 36 was measured using a laser power meter (Scientec Model D200PC) with attached calorimeter (Scientec Model AC2501). This power measurement was taken as the total power absorbed by the target 14 for the ensuing ignition test. The laser source 11 was then turned off and a test target 14 attached to the output tip 36. Excess fiber was pulled back through opening 17 until target 14 was positioned near the center of the chamber interior 18 atop a vertically aligned fiber (not shown) which was used to support the target. The visible low power aiming laser was used to verify that the target completely covered the tip 36.

Chamber 13 was sealed and evacuated and a flammable gas-air mixture introduced into chamber interior 18 through port 19. The laser was powered to the measured power level and ignition (if present) recorded by the video camera. An internal pressure transducer (not shown) was also used to sense ignition. Targets 14 were heated to incandescence in all tests whether or not an ignition was produced. Tests were determined to be non-ignitions and terminated after the video camera showed the intensity of incandescence dropped considerably or ceased. In most cases, tests were terminated within about one minute after turning on the laser 11. The flammability of the gas-air mixture was periodically verified using electric matches when experiments resulted in non-ignitions. The primary criterion for ignition was the visual appearance of flame on the video. Ignition was also confirmed by the explosion over pressures, which were about 55 to 100 psi for 6–10% methane-air mixtures. Peak pressures were from 2 to 5 psi for 5% methane-air ignition.

Figure 4:
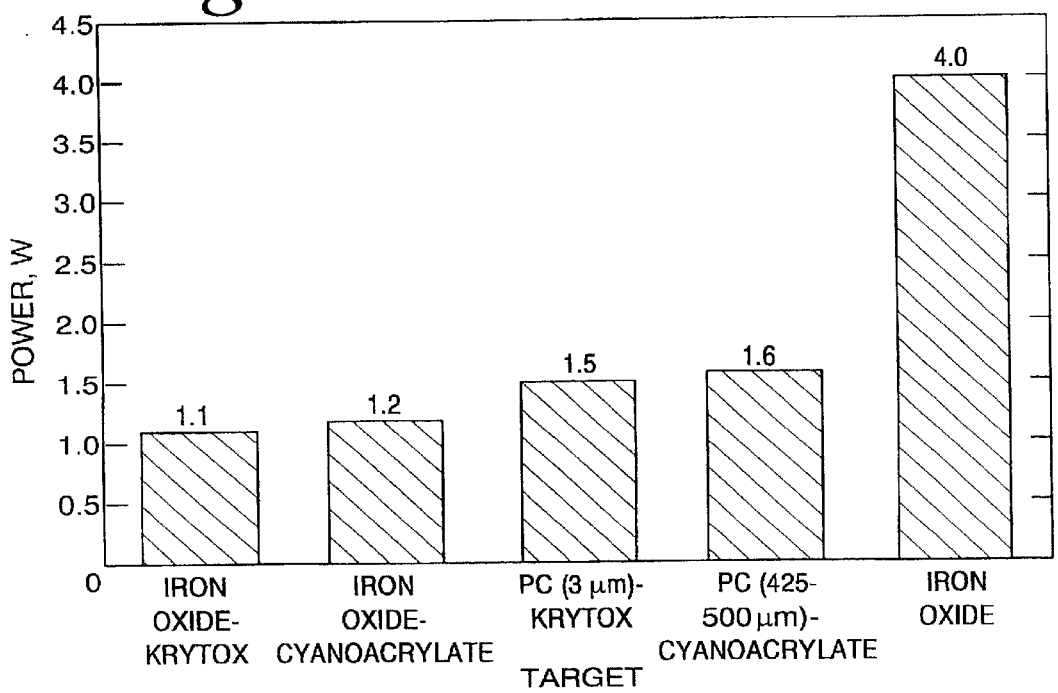
FIG. 4 is a graph of minimum igniting powers with selected targets placed on a 400 μm core optical fiber placed in flammable methane-air mixtures.

Various methods were used to attach targets 14 to the fiber tip 36. For example, a sample of iron oxide particles was mixed with isopropyl alcohol, applied to the tip of the fiber until the aiming laser was no longer visible, and allowed to dry before sealing and evacuating the chamber 18. Mixing the very fine particles with an inert lubricant, Krytox, provided better adhesion and the lowest igniting powers. Krytox is a fluorinated lubricant that has good temperature stability (low outgassing up to about 355° C.) and is non-flammable. The Krytox to particle ratio of the target mixture was about 1 to 3 by volume. Adhesives such as cyanoacrylate were not used extensively with very fine particles because of the potential heat of combustion contributions. The fiber-sized coal particles required an adhesive to adhere adequately to the fiber tip 36, so cyanoacrylates were used in those cases. A comparison of minimum igniting powers of various targets on a 400 $\mu$m fiber is shown in FIG. 4.

Figure 5:
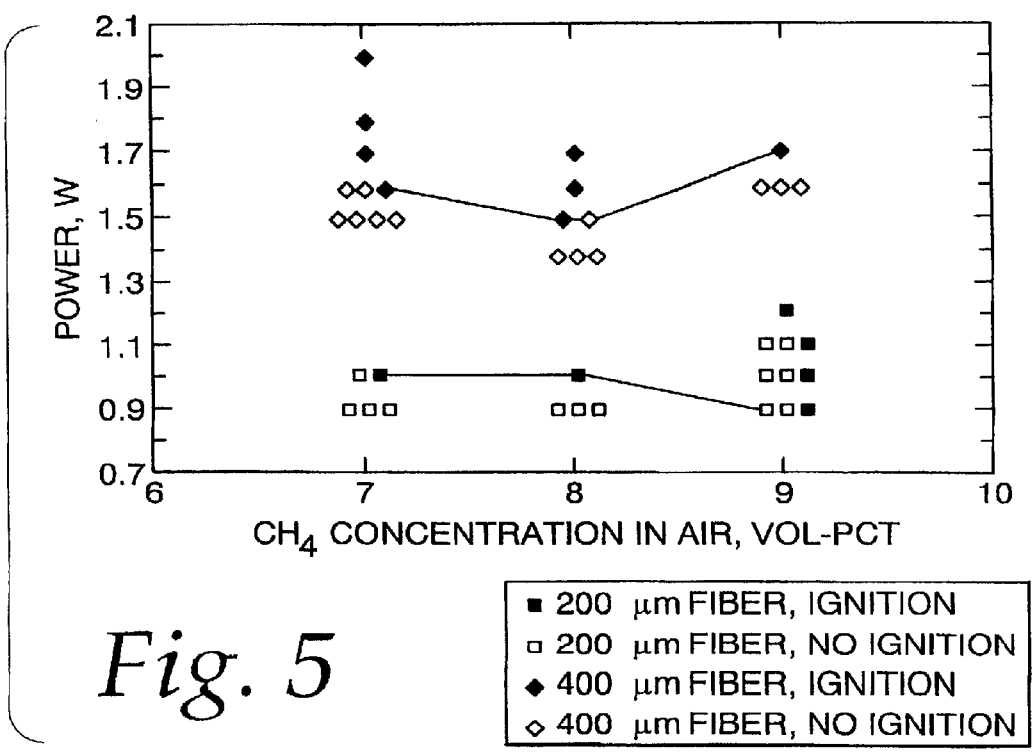
FIG. 5 is a graph of igniting powers for optical fibers tipped with Pittsburgh coal (3 μm)-Krytox mixture, placed in flammable methane-air mixture.
Figure 6:
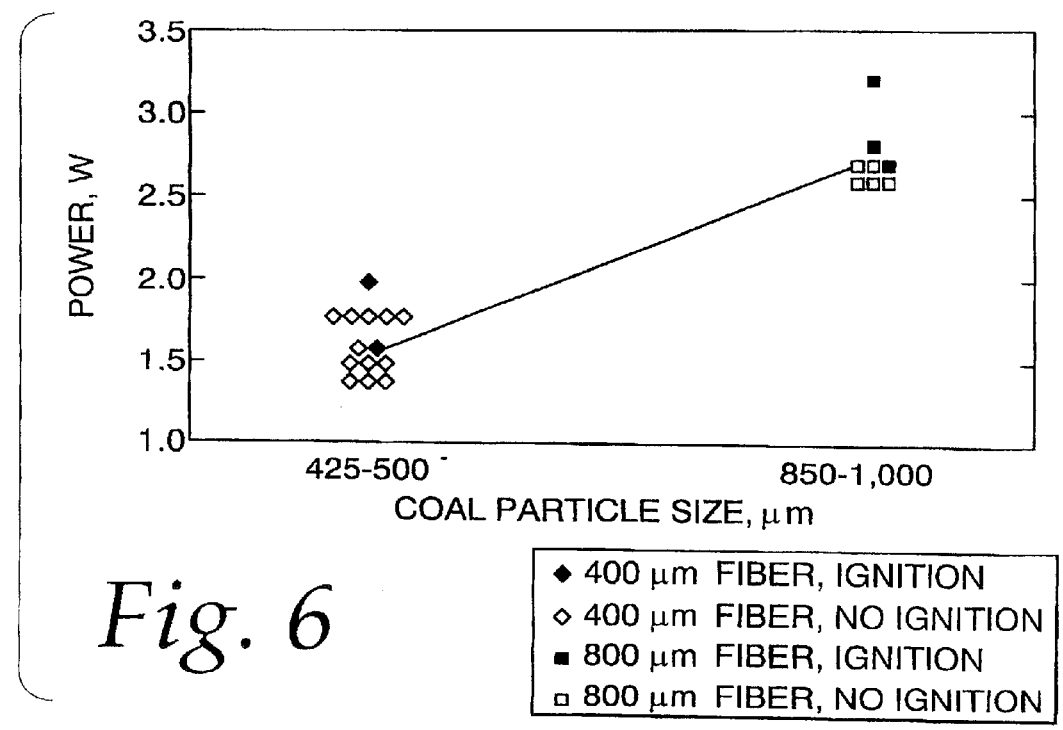
FIG. 6 is a graph of igniting power versus coal particle size for optical fiber tipped with fiber sized Pittsburgh coal cyanoacrylate targets, 8% methane in air.
Figure 7:
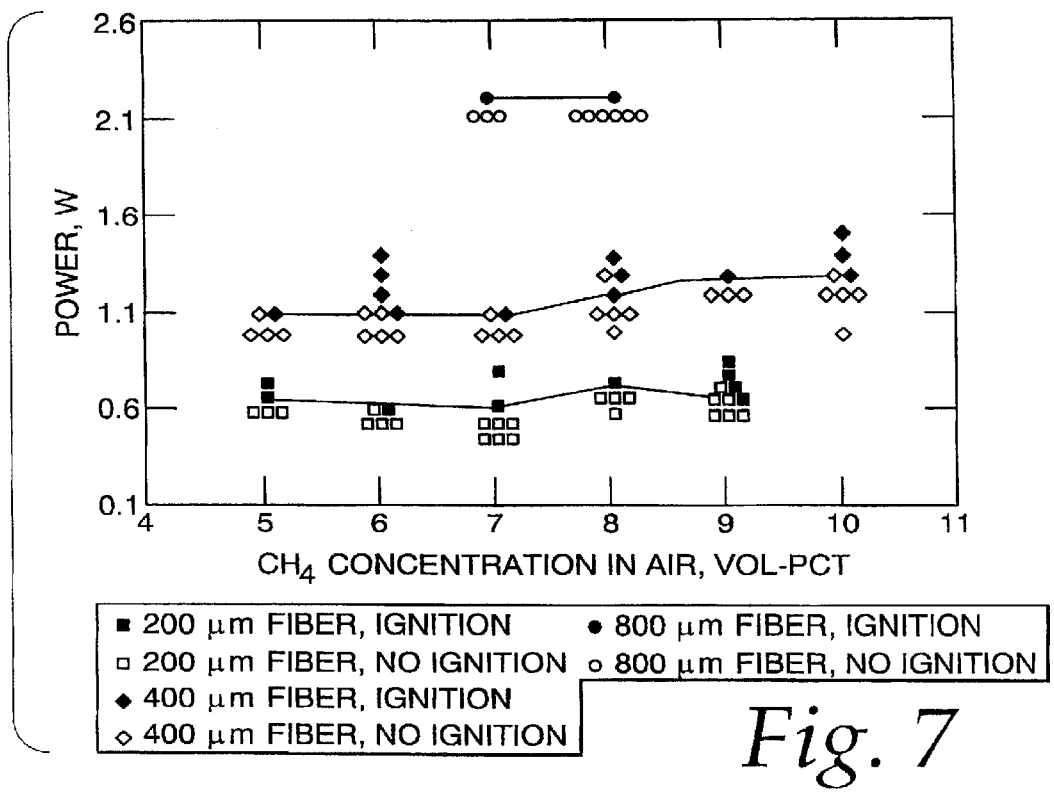
FIG. 7 is a graph of igniting powers for optical fibers tipped with iron oxide-Krytox placed in methane-air mixtures.

Experimental results are shown in FIGS. 5–7. In each series of tests with a fiber of a particular diameter, the methane concentration was varied to find the minimum igniting laser power. In general except for the fiber-sized coal particles shown in FIG. 6, each set of tests at a particular methane-air concentration was discontinued after three non-ignitions were obtained. Additional tests were conducted after obtaining four non-ignitions in one case because of irregular shapes and reflective (glossy) facets on the larger particles made it difficult to block the aiming laser. Minimum igniting powers for PC (3 $\mu$m) Krytox targets (see FIG. 5) were 0.9 watts for the 200 $\mu$m core taper fiber and 1.5 watts for the 400 $\mu$m core non-taper fiber. Minimum igniting powers for fiber-sized PC-cyanoacrylate targets in 8% methane-air mixtures (see FIG. 6) were 1.6 watts for 400 $\mu$m core non-taper fiber and 2.7 watts for 800 $\mu$m core non-taper fiber.

Figure 8:
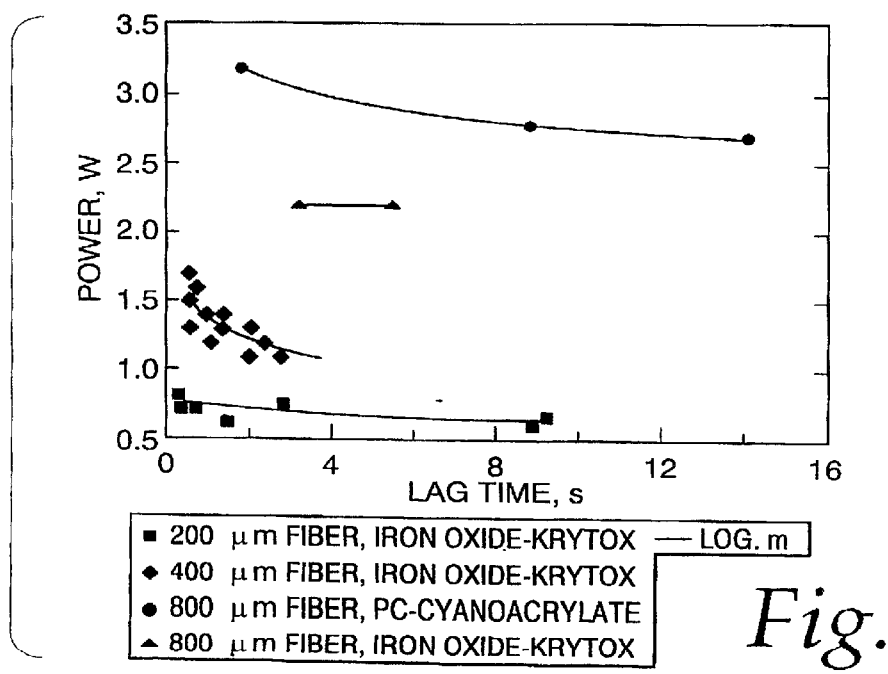
FIG. 8 is a graph of igniting power versus lag time for various targets placed in flammable methane-air mixtures.

Minimum igniting powers (see FIG. 7) with iron oxide Krytox targets were 0.6 watts, 1.1 watts and 2.2 watts with the 200 $\mu$m core taper, 400 $\mu$m core non-taper and 800 $\mu$m core non-taper fibers, respectively. The relatively flat response with methane concentration resembles autogenous ignition temperature (AIT) phenomena more than electrical spark (MIE) phenomena. Limiting thermal phenomena such as AIT are also characterized by large ignition lag times. Lag time trend is shown in FIG. 8. Ignition lag times were estimated by observing video tape recorded by the high speed camera system. Ignition lag was taken as the time between the first noticeable target glow and first noticeable flame front emanating from the target. In several cases, barely discernable flame fronts emanating from the target were followed by clearly visible flames appearing from other portions of the chamber 18.

Figure 9:
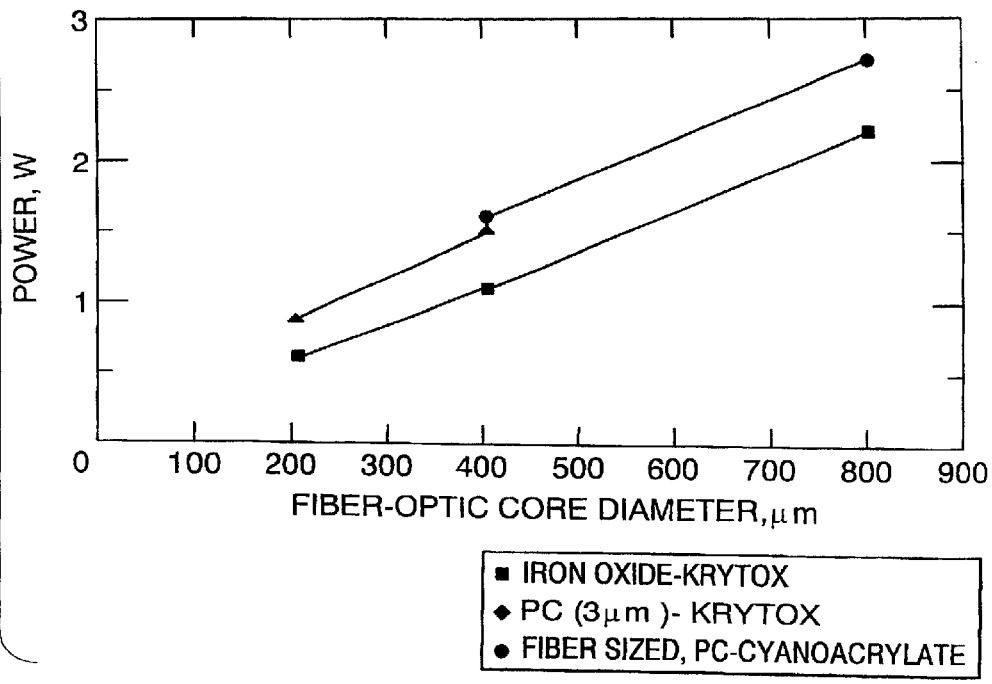
FIG. 9 is a graph of igniting power versus fiber optic core diameter for various targets.

A summary of minimum igniting powers versus core diameter is shown in FIG. 9. This graph shows that inert but more strongly absorbing iron oxide-Krytox targets consistently ignited methane-air mixtures at lower powers than coal targets in this study. Minimum igniting power densities for iron oxide-Krytox targets calculated by dividing the igniting power by the surface area of the fiber core produces values of 19.2, 8.7 and 4.4 watts per square millimeter for the 200 $\mu$m taper, 400 $\mu$m and 800 $\mu$m fibers, respectively. Comparing these calculations to FIG. 9 shows that smaller core fibers required lower incident powers for ignition than larger core fibers, but larger power densities.

Experimental approaches to assessing minimum igniting phenomena require a large number of tests to account for statistical variations in test conditions. The number of non-ignitions per test series in FIGS. 5–7 is roughly 10. In comparison, MSHA tests each electrical circuit for 1000 revolutions in a spark test apparatus, with multiple sparks for each revolution, resulting in at least 5000 make-break sparks. For this reason, a conservative safety factor should be applied to the curve in FIG. 9. Results suggest that larger core fibers are significantly less likely to cause ignition in methane-air mixtures, under certain test conditions. The likelihood of significant intensity fluctuations in multimode optcial fibers from modal variations or focusing effects from broken fibers, for example, may need to be considered where appropriate. Test results also show that tapered fibers produce lower igniting powers and approach limiting ignition lag times for quickly than untapered fibers. Thus, fiber optic tapers are useful for evaluating the failure mode where a multimode optical fiber is stretched to the breaking point with a concurrent reduction in fiber diameter at the breaking point.

Figure 10:
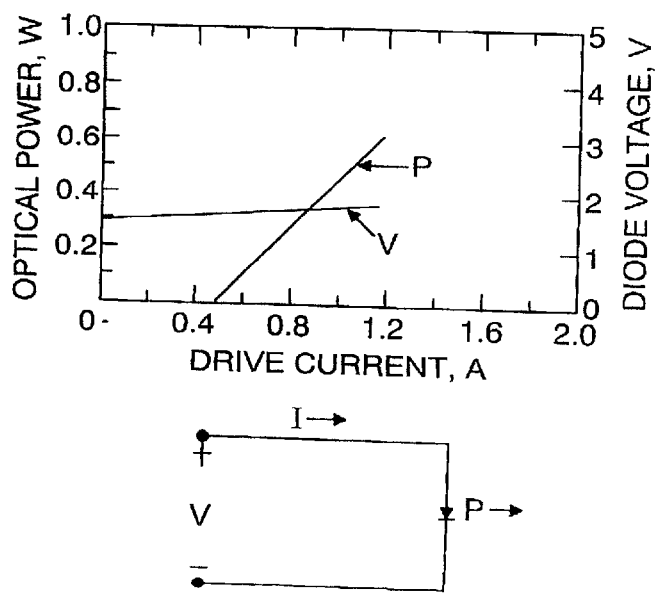
FIG. 10 is a graph of laser diode electrical input and CW optical power characteristics.
Figure 11:
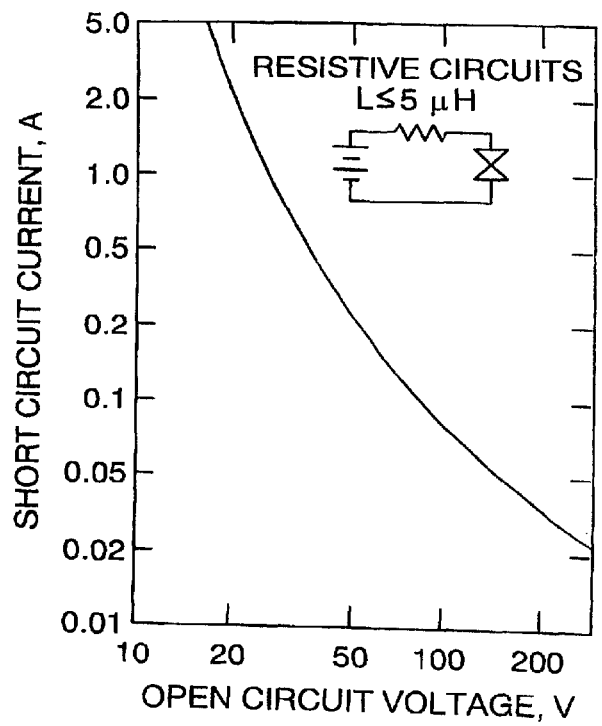
FIG. 11 is a graph of MSHA accepted ignition curve for resistive circuits.
Figure 12:
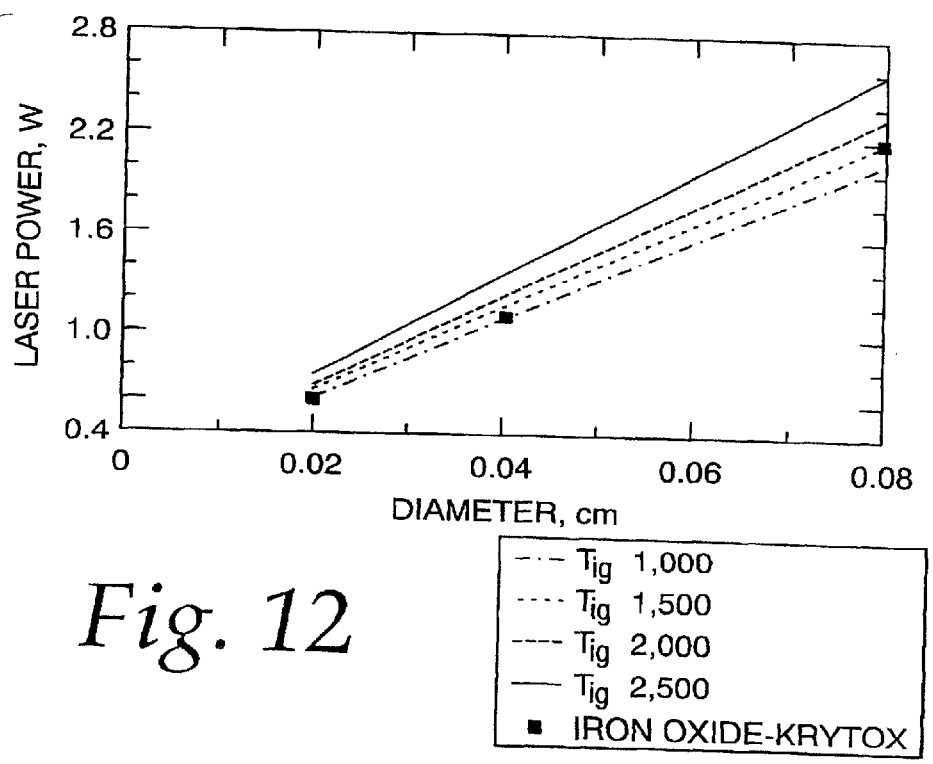
FIG. 12 is a plot of minimum laser power for ignition for various ignition temperatures, compared to the experimental data for iron oxide from FIG. 9.
Figure 13:
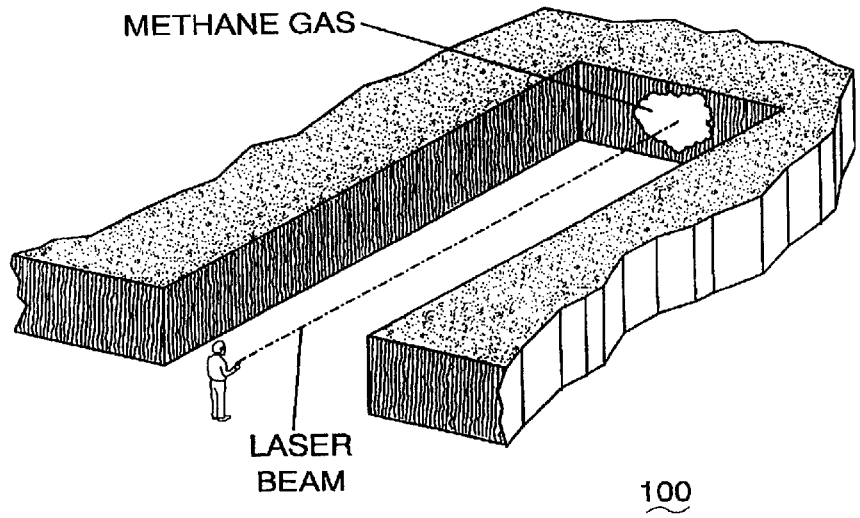
FIG. 13 is a schematic diagram of an open-beam, remote monitor.

FIG. 10 shows voltage, current and CW optical power characteristics for a commercial laser diode. The power is measured out of a 100 $\mu$m fiber optic pigtail. FIG. 11 shows the MSHA accepted electrical spark ignition curve for resistive circuits, plotting short circuit current versus open circuit voltage. Even at maximum drive current producing upwards of 600 milliwatts optical power, the laser diode drive circuit could be well within the safe boundary from an electrical spark point of view (below and to the left of the ignition curve). Considering also the optical conversion efficiency is less than 40%, the laser diode and drive circuit might be considered safe without further evaluation. However, 600 milliwatts optical power out of a 100 $\mu$m core diameter fiber is above the ignition curve of FIG. 9, indicating operation at a lower power may be prudent.

Larger coal particles required higher incident powers to ignite 8% methane-air mixtures in this study (FIG. 6), indicating heat of combustion contributions were negligible (coal particles were heated to white-hot incandescence in all tests). This does not necessarily apply to situations where much larger accumulations of coal dust may ignite.

Figure 14:
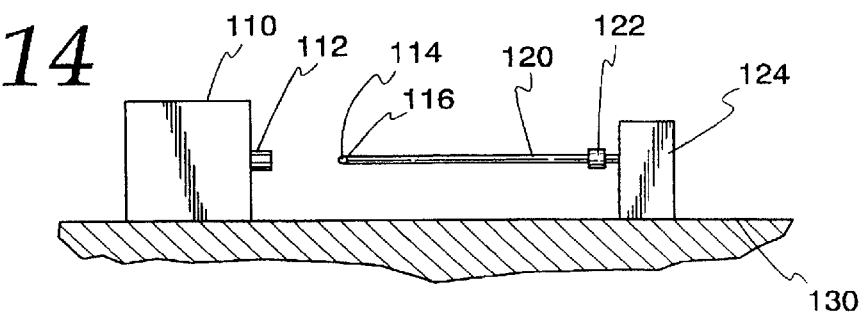
FIG. 14 is an alternate embodiment of the invention.
Figure 15:
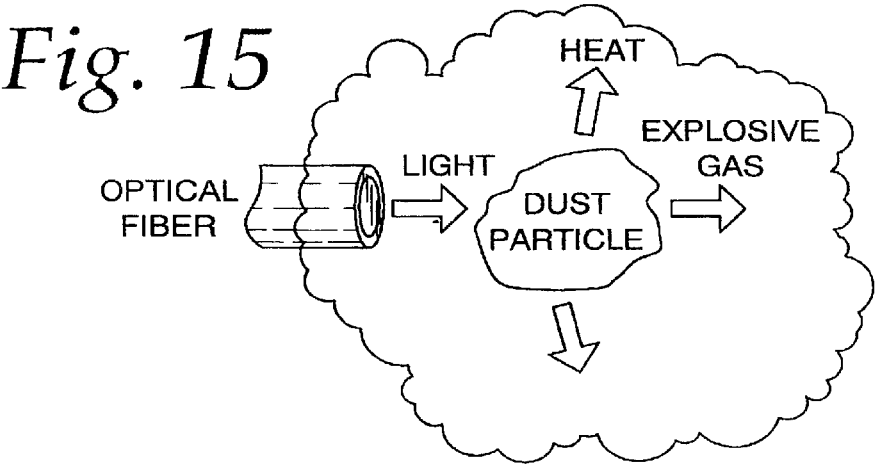
FIG. 15 is a schematic description of the ignition process for the conversion of optical energy to thermal energy by absorption in an appropriate target.

To measure the effect of optical power on temperature of larger accumulations of coal dust, such as might cause smoldering or burning, an alternative embodiment of the invention may be used. Referring now to FIG. 14, an alternate embodiment of the invention is generally shown therein and identified by reference numeral 100. In this embodiment, apparatus 100 is used to measure the temperature of targets on the ends of optical fibers. Temperature information is used to determine the risk of smoldering fire hazards on accumulations of coal dust on surfaces. Infrared (IR) camera 110 focuses on target 114, attached to the output end of fiber taper 120, which is coupled via optical coupler 122 to optical source 124.

Preferably IR camera 110 is an Agema 550 thermal imaging camera, which records temperatures of particles 114 on optical fiber tip 116 heated by laser power from source 124 that produced methane-air ignition. The Agema 550 camera system measures the IR radiation at wavelengths of 3.6 to 5 $\mu$m and shows the calculated temperatures as a false color display on a monitor. The maximum temperature in the area of interest is displayed as a numerical value. The IR camera was calibrated up to 1500° C. A 30/80 closeup lens 112 allowed very high spatial resolution. Prior to observations of the optical fiber, the temperature calibration and spatial resolution of the IR camera 110 were confirmed by using small apertures placed in front of a blackbody source.

To measure the temperatures of targets 114 on the end of optical fiber 120, both the IR camera 110 and the optical fiber 120 were positioned on optical bench 130. The chamber 13 (FIG. 1) was not needed for these tests. The camera 110 was positioned about 5 cm from the end of the fiber taper 120 coated with an iron oxide target 114. The fiber 120 was tilted approximately 40 degrees from vertical (50 degrees from the camera axis) to maximize the viewing area of the fiber tip 116.

While there has been illustrated and described a particular embodiment of the present invention, it will be appreciated that numerous changes and modifications will occur to those skilled in the art, and it is intended in the appended claims to cover all those changes and modifications which followed in the true spirit and scope of the present invention.

What is claimed is:

1. A method for determining a safe power output for an optical source emitting optical power in an environment containing hazardous material, the method comprising:

providing a tapered optical fiber having an input end and an output end, wherein the diameter of the output end is smaller than the diameter of the input end;

optically coupling the optical source to the input end of the optical fiber;

applying a predetermined amount of optical power to the optical fiber with the optical source;

measuring the optical power emitted at the output end of the optical fiber; and positioning a target to absorb optical power from the output end of the optical fiber.

2. The method of claim 1, further comprising positioning the output end of the optical fiber and the target in an environment of flammable material and detecting whether the flammable material is ignited by the target.

3. The method of claim of claim 2, wherein the output end of the optical fiber and the target are positioned in a chamber containing flammable material.

4. The method of claim 2, further comprising determining the minimum igniting power required to ignite the flammable material.

5. The method of claim 1, wherein the target is disposed on the output end of the optical fiber.

6. The method of claim 1, further comprising measuring the temperature of the target.

7. The method of claim 1, further comprising detecting whether smoldering of the target occurs.

8. The method of claim 1, wherein the diameter of the input end of the optical fiber is about 400 $\mu$m and the diameter of the output end of the optical fiber is about 200 $\mu$m.

9. The method of claim 1, wherein the optical source comprises a laser diode.

10. The method of claim 2, wherein the flammable material comprises methane.

11. The method of claim 1, wherein the input end and the output end of the optical fiber have circular cross sections.

12. A method for determining a safe power output for an optical source emitting optical power in an environment containing hazardous material, the method comprising:

providing a tapered optical fiber having an input end and an output end, wherein the diameter of the output end is smaller than the diameter of the input end;

optically coupling the optical source to the input of the optical fiber;

applying a predetermined amount of optical power to the input end of the optical fiber with the optical source for which the optical power emitted at the output end of the optical fiber is known; and positioning a target to absorb optical power from the output end of the optical fiber.

13. The method of claim 12, further comprising positioning the output end of the optical fiber and the target in an environment of flammable material and detecting whether the flammable material is ignited by the target.

14. The method of claim 13, wherein the output end of the optical fiber and the target are positioned in a chamber containing flammable material.

15. The method of claim 13, further comprising determining the minimum igniting power required to ignite the flammable material.

16. The method of claim 12, wherein the target is disposed on the output end of the optical fiber.

17. The method of claim 12, further comprising measuring the temperature of the target.

18. The method of claim 17, further comprising detecting whether smoldering of the target occurs.

19. The method of claim 12, wherein the diameter of the input end of the optical fiber is about 400 $\mu$m and the diameter of the output end of the optical fiber is about 200 $\mu$m.

20. The method of claim 12, wherein the input end of the optical fiber has a first circular cross-sectional area and the output end of the optical fiber has a second circular cross-sectional area, the second cross-sectional area being smaller than the first cross-sectional area.

21. An apparatus for determining a safe power output for an optical source emitting optical power in an environment containing hazardous material, the apparatus comprising:

a tapered optical fiber having an input end and an output end, the input end having a first diameter, the output end having a second diameter, the second diameter being smaller than the first diameter, the input end being adapted to be optically coupled to the optical source;

a power output measuring apparatus for measuring the optical power emitted at the output end of the optical fiber; and a target for placing at a position to absorb optical power emitted from the output end of the optical fiber.

22. The apparatus of claim 21, further comprising an optical coupler for optically coupling the input end of the optical fiber to the optical source.

23. The apparatus of claim 21, further comprising a chamber for receiving flammable material, and wherein the output end of the optical fiber and the target are disposed within the chamber.

24. The apparatus of claim 21, further comprising a temperature measuring device for measuring the temperature of the target when the target is heated by the optical source.

25. The apparatus of claim 21, wherein the optical source comprises a laser diode.

26. The method of claim 21, wherein the first diameter of the optical fiber is about 400 $\mu$m and the second diameter of the optical fiber is about 200 $\mu$m.

27. The method of claim 21, wherein the target is disposed on the output end of the optical fiber.

28. The method of claim 23, wherein the flammable material is methane.

29. The method of claim 21, wherein the input end of the optical fiber has a first circular cross-sectional area and the output end of the optical fiber has a second circular cross-sectional area, the second cross-sectional area being smaller than the first cross-sectional area.

* * * * *

UNITED STATES PATENT AND TRADEMARK OFFICE
CERTIFICATE OF CORRECTION

PATENT NO. : 6,667,801 B1
DATED : December 23, 2003
INVENTOR(S) : Dubaniewicz et al.

It is certified that error appears in the above-identified patent and that said Letters Patent is hereby corrected as shown below:

Column 2,
Line 27, "Details the these" should be -- Details of these --.

Column 3,
Line 18, "optical fiber having" should be -- optical fiber has --.

Column 8,
Line 4, "optcial" should be -- optical --.
Line 8, "for" should be -- more --.

Signed and Sealed this

First Day of February, 2005

JON W. DUDAS
*Director of the United States Patent and Trademark Office*